United States Patent
Mark et al.

(10) Patent No.: US 11,760,495 B2
(45) Date of Patent: **\*Sep. 19, 2023**

(54) CONTROL SYSTEMS FOR HYBRID ELECTRIC POWER PLANTS

(71) Applicant: Pratt & Whitney Canada Corp., Longueuil (CA)

(72) Inventors: Michael Mark, Montreal (CA); Paul C. Imel, Hartford, CT (US); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 481 days.

This patent is subject to a terminal disclaimer.

(21) Appl. No.: 16/875,911

(22) Filed: May 15, 2020

(65) Prior Publication Data
US 2021/0354837 A1 Nov. 18, 2021

(51) Int. Cl.
*H02P 29/60* (2016.01)
*B64D 27/24* (2006.01)
(Continued)

(52) U.S. Cl.
CPC ............ *B64D 27/24* (2013.01); *B64D 31/00* (2013.01); *H02H 7/0833* (2013.01);
(Continued)

(58) Field of Classification Search
CPC ..... H02P 29/60; H02P 29/027; H02H 7/0833; B64D 31/00; B64D 2027/026
See application file for complete search history.

(56) References Cited

U.S. PATENT DOCUMENTS 9,561,860 B2 * 2/2017 Knapp ................ G08G 5/0086
10,006,375 B1 6/2018 Wagner et al.
(Continued)

FOREIGN PATENT DOCUMENTS

EP 3613674 A1 2/2020
EP 3927620 A1 12/2021

OTHER PUBLICATIONS

Extended European search report issued in corresponding EP application No. 21174143.4, dated Oct. 13, 2021 (8 pages).
(Continued)

*Primary Examiner* — Rina I Duda
(74) *Attorney, Agent, or Firm* — Norton Rose Fulbright Canada LLP

(57) ABSTRACT

A control system for a hybrid electric powerplant of an aircraft can include a heat engine controller configured to receive one or more power settings and to determine a heat engine setting and an electric motor setting. The heat engine controller can be configured to use the heat engine setting to control a heat engine system as a function of the heat engine setting to control torque output by a heat engine. The heat engine controller can be configured to output the electric motor setting. The system can include an electric motor controller can be operatively connected to the heat engine controller. The electric motor controller configured to receive the electric motor engine setting from the heat engine controller and to control an electric motor system as a function of the electric motor setting to control torque output by an electric motor. The system can include a system protection module that can be part of or connected to the heat engine controller and can be configured to provide one or more protection commands to directly control one or more heat engine protection systems and one or more electric motor protection systems.

20 Claims, 2 Drawing Sheets

(51) Int. Cl.
*B64D 31/00* (2006.01)
*H02H 7/08* (2006.01)
B64D 27/02 (2006.01)
H02P 29/024 (2016.01)

(52) U.S. Cl.
CPC ...... *B64D 2027/026* (2013.01); *H02P 29/027* (2013.01); *H02P 29/60* (2016.02)

(56) References Cited

U.S. PATENT DOCUMENTS

| | | |
|---|---|---|
| 2012/0209456 A1 | 8/2012 | Harmon |
| 2016/0236790 A1* | 8/2016 | Knapp .................. G01C 21/20 |
| 2020/0062414 A1* | 2/2020 | Hon ....................... B64D 37/00 |
| 2020/0063599 A1* | 2/2020 | Waun .................... B60L 1/003 |

OTHER PUBLICATIONS

European Patent Office, Communication pursuant to Article 94(3) EPC for European patent application No. 21174143.4, dated Mar. 28, 2023.

* cited by examiner

CONTROL SYSTEMS FOR HYBRID ELECTRIC POWER PLANTS

FIELD

This disclosure relates to control systems for hybrid electric powerplants.

BACKGROUND

When determining potential control system architecture concepts for propeller-driven hybrid-electric propulsion systems, there are infinite possibilities to split the functionality between the different control lanes. Challenges arise when considering potential safety and certification ramifications when splitting functionality between different control lanes.

Such conventional methods and systems have generally been considered satisfactory for their intended purpose. However, there is still a need in the art for control systems for hybrid electric powerplants. The present disclosure provides a solution for this need.

SUMMARY

A control system for a hybrid electric powerplant of an aircraft can include a heat engine controller configured to receive one or more power settings and to determine a heat engine setting and an electric motor setting. The heat engine controller can be configured to use the heat engine setting to control a heat engine system as a function of the heat engine setting to control torque output by a heat engine. The heat engine controller can be configured to output the electric motor setting. The system can include an electric motor controller can be operatively connected to the heat engine controller. The electric motor controller configured to receive the electric motor engine setting from the heat engine controller and to control an electric motor system as a function of the electric motor setting to control torque output by an electric motor. The system can include a system protection module that can be part of or connected to the heat engine controller and can be configured to provide one or more protection commands to directly control one or more heat engine protection systems and one or more electric motor protection systems.

The system can include an electric motor protection module that is part of or connected to the electric motor controller and configured to provide one or more protection commands to directly control one or more electric motor protection systems. In certain embodiments, the system protection module can be configured to provide powertrain level protection for the electric motor system and the electric motor protection module can be configured to provide lane level protection to the electric motor system.

For example, the powertrain level protection can include uncontrollable high thrust protection, and/or the lane level protection can include overspeed, overcurrent, and/or over temperature protection. The system protection module can be configured to provide heat engine overspeed and/or shaft shear protection. Any other suitable protection types, system or lane level, e.g., as appreciated by those having ordinary skill in the art, are contemplated herein.

In certain embodiments, the heat engine controller can be configured to determine a propeller setting and to use the propeller setting to control a propeller control system as a function of the propeller setting. The system protection module can be configured to provide one or more protection commands to directly control one or more propeller protection systems, for example.

The heat engine controller and/or the system protection module can be operatively connected to each of the electric motor, the heat engine, and/or the propeller system to receive feedback therefrom to provide control thereto and/or protection control thereto. The electric motor protection module can be operatively connected to the electric motor to receive electric motor feedback therefrom to provide protection control for the electric motor.

The electric motor system can include a battery management system (BMS). The electric motor protection system can include an electrical cutoff switch disposed between the BMS and the electric motor. The electrical cutoff switch can be configured to be controlled by the electric motor protection module and the system protection module to cut off electrical energy to the electric motor in a protection state.

The heat engine system can be a fuel control unit, for example. The heat engine protection system can include a fuel shutoff valve configured to be controlled by the system protection module to cut off fuel flow to the fuel control unit in a protection state.

The propeller control system can be a propeller control unit configured to control a pitch of the propeller. The propeller protection system can include a feathering valve configured to be controlled by the system protection module to coarsen the pitch of the propeller in a protection state, for example.

The electric motor controller and/or the electric motor protection module can be operatively connected to the heat engine controller to provide controller operation feedback and/or respective system feedback to the heat engine controller. The heat engine controller can include a thrust control module configured to divide a thrust command into an electric torque command for use by the electric motor controller and a heat engine torque command for use by the heat engine controller such that the electric engine settings include the electric torque command and the heat engine settings include a heat engine torque command. In certain embodiments, the heat engine controller can include a propeller control module configured to receive a propeller mode setting and to output a propeller setting to achieve the selected propeller mode.

The heat engine controller can be configured to receive feedback from the electric motor protection module for detection and/or reporting of a problem with the electric motor system to diagnose a cause and/or resolve the problem by controlling a different system. In certain embodiments, the heat motor feedback, the electric motor feedback, and/or the propeller system feedback can include a torque value and/or a speed value. In certain embodiments, the heat engine feedback includes a temperature value for detecting heat engine fire. Any other suitable feedback is contemplated herein.

In certain embodiments, ambient air data can be input to the heat engine controller and/or to the system protection module. For example, the heat engine controller and/or the system protection module can be configured to use the ambient air data for control and/or protection control, respectively.

In accordance with at least one aspect of this disclosure, a method can include controlling an electric motor with an electric motor controller, controlling a heat engine with a heat engine controller, and providing an electric motor torque command to the electric motor controller from the heat engine controller. The method can include providing overspeed or overtorque protection to the electric motor with an electric motor protection module that is part of or connected to the electric motor controller, providing overspeed or overtorque protection to the heat engine with a system protection module that is part of or connected to the heat engine controller, and providing uncontrollable thrust protection for the electric motor using the system protection module. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
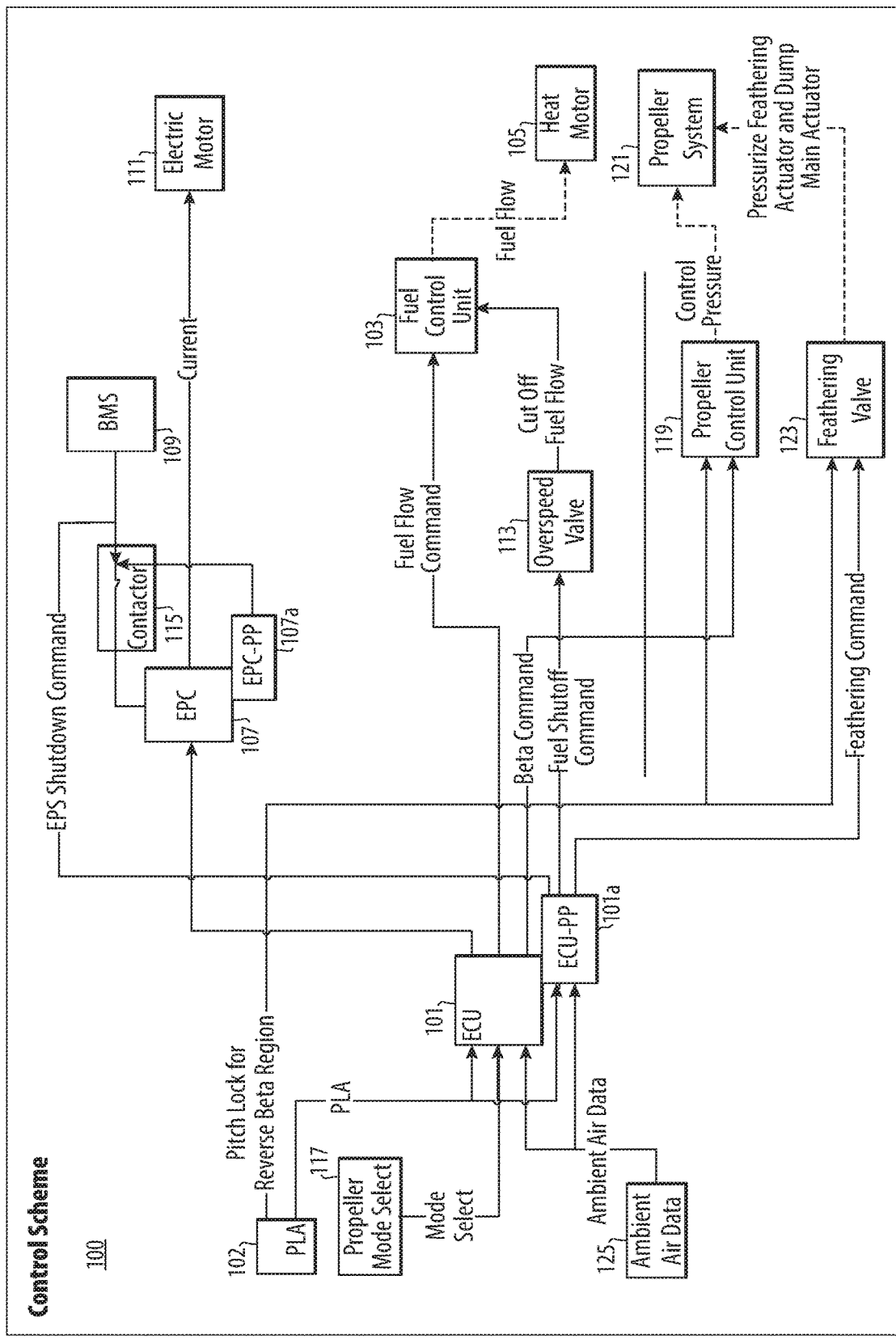
FIG. 1 is a schematic diagram of an embodiment of a control system in accordance with this disclosure, schematically showing input data flow.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

Figure 2:
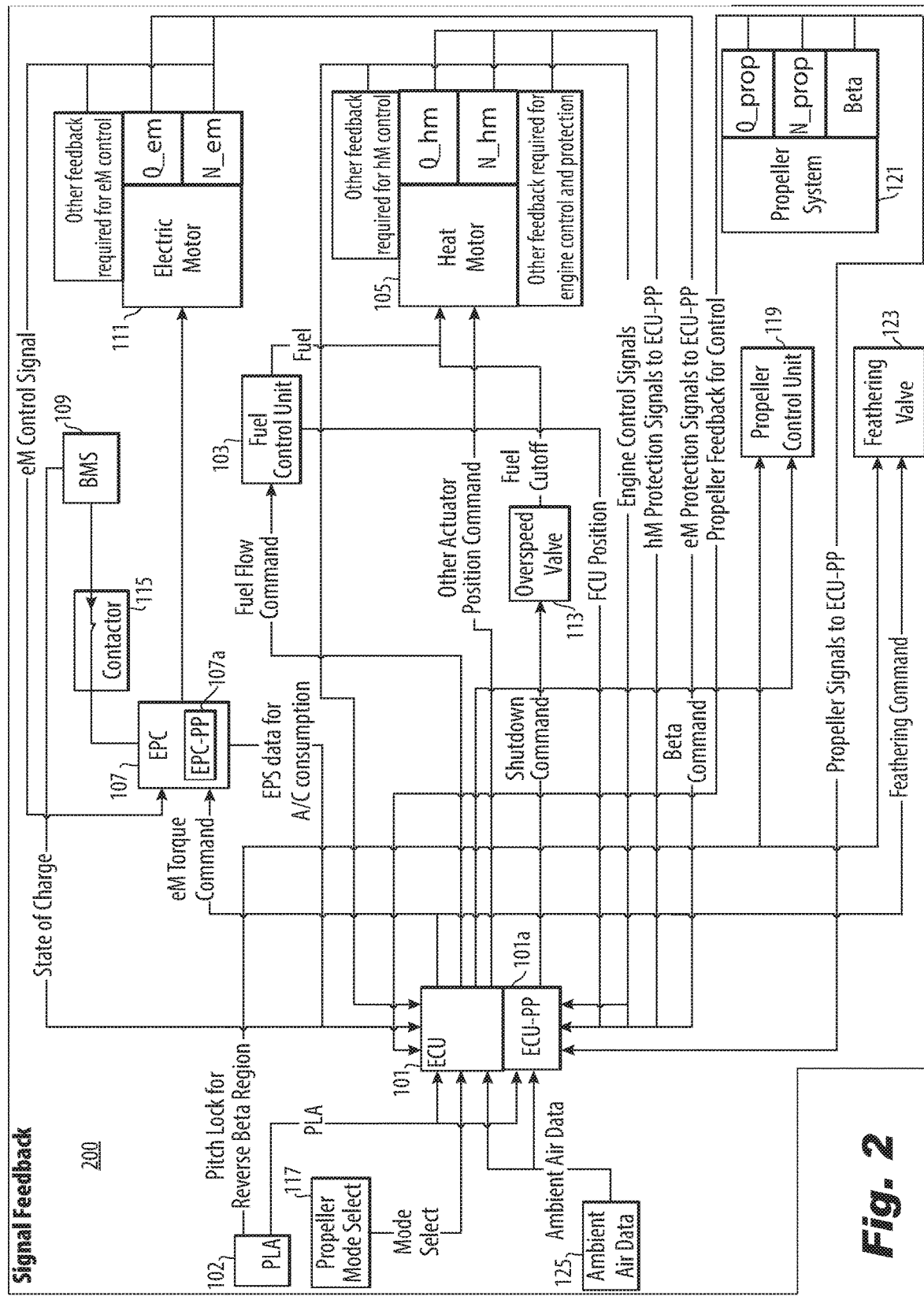
FIG. 2 is a schematic diagram of the embodiment of FIG. 1, additionally showing feedback flow.

Referring to FIGS. 1 and 2, a control system 100 for a hybrid electric powerplant of an aircraft can include a heat engine controller 101 configured to receive one or more power settings (e.g., throttle and/or propeller setting, e.g., power lever angle (PLA) from a power lever 102) output and to determine a heat engine setting (e.g., a torque) and an electric motor setting (e.g., a torque). The heat engine controller 101 can be configured to use the heat engine setting to control a heat engine system 103 as a function of the heat engine setting to control torque output by a heat engine 105. The heat engine controller 101 can be configured to output the electric motor setting.

The system 100 can include an electric motor controller 107 can be operatively connected to the heat engine controller 101. The electric motor controller 107 can be configured to receive the electric motor engine setting from the heat engine controller 101 and can be configured to control an electric motor system 109, 111 (e.g., a battery management system and/or electric motor 111) as a function of the electric motor setting to control torque output by an electric motor 111.

The system 100 can include a system protection module 101a that can be part of or connected to the heat engine controller 101 and can be configured to provide one or more protection commands to directly control one or more heat engine protection systems 113 and one or more electric motor protection systems 115. The system protection module 101a can directly or indirectly connected to any suitable protection systems or other suitable control systems of any system of the powerplant to provide protection control thereto. The system protection module 101a can be integrated with and/or independent of the heat engine controller 101 in any suitable manner.

The system 100 can include an electric motor protection module 107a that is part of or connected to the electric motor controller 107 and configured to provide one or more protection commands to directly control one or more electric motor protection systems 115. In certain embodiments, the system protection module 101a can be configured to provide powertrain level protection for the electric motor system and the electric motor protection module 107a can be configured to provide lane level protection to the electric motor system.

For example, the powertrain level protection can include uncontrollable high thrust protection (e.g., such that the system protection module 101a shuts down power to the electric motor 111 if thrust is above a threshold or determined to be out of control of the electric motor controller 107). In certain embodiments, the lane level protection can include overspeed, overcurrent, and/or over temperature protection (e.g., such that the electric motor protection module 107a shuts down power to the electric motor 111 if speed, current to the electric motor 111, and/or motor and/or battery temperature are above a threshold). The system protection module 101a can also be configured to provide heat engine overspeed and/or shaft shear protection in certain embodiments (e.g., such that the system protection module shuts off fuel flow to the heat engine 105 if speed and/or a strain on a shaft is above a threshold). Any other suitable protection types, system and/or lane level, e.g., as appreciated by those having ordinary skill in the art, are contemplated herein.

In certain embodiments, the heat engine controller 101 can be configured to determine a propeller setting (e.g., based on a condition lever angle (CLA) or a selected propeller mode from a mode selector 117) and to use the propeller setting to control a propeller control system 119 (e.g., a PCU) as a function of the propeller setting to control a pitch of a propeller (e.g., via a hydraulic pitch control as appreciated by those having ordinary skill in the art in view of this disclosure). The system protection module 101a can be configured to provide one or more protection commands to directly control one or more propeller protection systems 123, for example.

The heat engine controller 101 and/or the system protection module 101a can be operatively connected to each of the electric motor 111, the heat engine 105, and/or the propeller system 121 to receive feedback therefrom to provide control thereto (directly or indirectly) and/or protection control thereto (directly or indirectly). The electric motor protection module 107a can be operatively connected to the electric motor 111 (directly or indirectly) to receive electric motor feedback therefrom to provide protection control for the electric motor 111. Any suitable feedback, e.g., from any suitable sensor, is contemplated herein.

The electric motor system 109 can include a battery management system (BMS), e.g., as shown. In certain embodiments, the electric motor protection system 115 can include an electrical cutoff mechanism (e.g., a controllable contactor) disposed between the BMS 109 and the electric motor 111. The electrical cutoff mechanism (e.g., a switch) can be configured to be controlled by the electric motor protection module 107a and/or the system protection module 101a to cut off electrical energy to the electric motor 111 in a protection state, for example (e.g., overthrust, overcurrent, overspeed, etc.).

The heat engine system 103 can be a fuel control unit, e.g., as shown, for example. In certain embodiments, the heat engine protection system 113 can include a fuel shutoff valve (e.g., an overspeed valve) configured to be controlled by the system protection module 101a to cut off fuel flow to the fuel control unit 103 in a protection state, for example.

The propeller control system 119 can be a propeller control unit, e.g., as shown that can be configured to control a pitch of the propeller 121 (e.g., via a hydraulic oil system or any other suitable system). The propeller protection system 123 can include a feathering valve, e.g., as shown, configured to be controlled by the system protection module 101a to coarsen the pitch of (e.g., feather) the propeller 121 in a protection state, for example. The propeller protection system 123 can be configured to protect against propeller overspeed, propeller overtorque, and/or inadvertent operation in reverse propeller angle, for example. Any other suitable protection systems are contemplated herein.

In certain embodiments, the electric motor controller 107 and/or the electric motor protection module 107a can be operatively connected to the heat engine controller 101 to provide controller operation feedback and/or respective system feedback to the heat engine controller. The heat engine controller 101 can include a thrust control module configured to divide a thrust command into an electric torque command for use by the electric motor controller 107 and a heat engine torque command for use by the heat engine controller 101 such that the electric engine settings include the electric torque command and the heat engine settings include a heat engine torque command. In certain embodiments, the heat engine controller 101 can include a propeller control module configured to receive a propeller mode setting (e.g., quite mode, cruise mode, max power mode) and to output a propeller setting (e.g., to the propeller control system 119) to achieve the selected propeller mode.

The heat engine controller 101 can be configured to receive feedback from the electric motor protection module 107a for detection and/or reporting of a problem with the electric motor system to diagnose a cause and/or resolve the problem, e.g., by controlling a different system (e.g., the heat engine system).

In certain embodiments, the heat motor feedback, the electric motor feedback, and/or the propeller system feedback can include a torque value and/or a speed value. In certain embodiments, the heat engine feedback includes a temperature value for detecting heat engine fire. Any other suitable feedback is contemplated herein.

In certain embodiments, ambient air data can be input to the heat engine controller 101 and/or to the system protection module 101a, e.g., from one or more air data sensors 125. For example, the heat engine controller 101 and/or the system protection module 101a can be configured to use the ambient air data for control and/or protection control, respectively. In certain embodiments, air data can be provided to the electric motor controller 107 and/or the electric motor protection controller 107a. Any other suitable data flow and/or feedback flow is contemplated herein.

In certain embodiments, the heat engine controller 101 can be configured to output one or more values of the feedback and/or air data to an aircraft cockpit display (e.g., battery state of charge, electric motor torque, heat engine torque, electric motor temperature, heat engine temperature), for example. Any suitable display and any suitable values are contemplated herein.

In certain embodiments, the heat engine controller can be located in the fuselage of the aircraft and the electric motor controller can be located in the fuselage, wing, or HEP. In certain embodiments, the heat engine controller can be disposed within an avionics stack in a cockpit of the aircraft. Any suitable locations are contemplated herein.

In accordance with at least one aspect of this disclosure, a method can include controlling an electric motor with an electric motor controller, controlling a heat engine with a heat engine controller, and providing an electric motor torque command to the electric motor controller from the heat engine controller. The method can include providing overspeed or overtorque protection to the electric motor with an electric motor protection module that is part of or connected to the electric motor controller, providing overspeed or overtorque protection to the heat engine with a system protection module that is part of or connected to the heat engine controller, and providing uncontrollable thrust protection for the electric motor using the system protection module. The method can include any other suitable method(s) and/or portion(s) thereof.

Certain embodiments do not include or require a separate thrust controller for splitting thrust commands between the heat engine controller and the electric motor controller as the heat engine controller (e.g., an ECU). Certain embodiments can provide flexibility for controlling propeller state as a function of ambient conditions and an input mode (e.g., quiet mode). For example, in certain embodiments, there is no propeller electronic controller (PEC) needed to decode a mode or CLA command as the heat engine controller can perform this function.

The system protection module (e.g., part of the heat engine controller) can also handle the protection for the thermal torque lane as well as the propeller system in certain embodiments. In certain embodiments, the system protection module (e.g., part of the heat engine controller) can also handle HEP level protection only for electric motor system (e.g., shut down due to high thrust condition, which can down the entire HEP), and all other protections can be performed by the electric motor protection module. Embodiments can reduce the number of controllers in the overall system 100, reducing size and weight of the system while maintaining functionality.

In certain embodiments, the system can utilize a consolidated power command from the aircraft via a single lever (by setting a desired mode), the heat engine controller can be a primary command receiver, there may be no direct power command signal to the electric motor controller, there may be separate propeller control from engine control, and there may be no mechanical disconnect.

The heat engine controlled (e.g., an engine control unit (ECU)) can be the power and thrust command controller of the hybrid electric propulsion (HEP) system which includes an electric motor, heat motor, and a propeller system. The ECU can receive the pilot thrust/power command in the form of a Power Lever Angle (PLA) signal, the pilot commanded propeller speed in the form of the PLA signal, a propeller select signal to determine the propeller operation mode desired by the pilot, and the ambient air conditions from the aircraft signals, for example. The ECU can use the aircraft signals to determine the power demand for the total HEP system and can split the demand into the commands to the electric motor (eM), heat motor (hM), and propeller systems. The speed governing of the HEP could be performed by the propeller control system or the hM control system.

Using received aircraft data, the ECU can translate the power command, ambient air conditions, and propeller mode select to determine the propeller blade angle (beta) and the power split between the hM and eM. Ambient air conditions can affect the thrust generated by the propeller and the hM performance. The ECU can have performance maps and models of the propeller and hM performance to determine the optimum motor and propeller operating points to meet the thrust command with the given propeller select mode. The ECU can manage interactions between the motors and the propeller system such as torque spikes. After calculating the torque split and the propeller output speed, the ECU can send the fuel flow command to a Fuel Control Unit (FCU) to manage hM torque (Q_hm), the electric powertrain controller (EPC) can receive the torque command (Q_eM) from the ECU, and the ECU can send the beta command to the propeller control unit (PCU) to control the blade angle and ultimately the speed of the propeller speed. The ECU will also relay the overall operation of thermal engine effectors to meet the aircraft servicing needs (electrical power, bleed air, hydraulic power, etc.).

The ECU can send the beta command to the PCU to drive the requested propeller speed. The cockpit can also send a beta pitch lock signal to the ECU and PCU, for example (e.g., from a manual input in the cockpit activated by a pilot). The beta lock can provide an indication when the PLA is in the reverse beta region. In the PCU, this can hydraulically unlock the region of the PCU to allow pressurization to the reverse beta blade angle range. In the ECU, it can allow a cross-reference with the PLA to determine whether the propeller system is permitted to enter the reverse beta region. Other propeller functions can be located in the ECU, for example. Any split of functionality between the PCU and the ECU are contemplated herein.

The ECU can include separate electronics to perform the protection functions to protect against propeller overspeed, propeller overtorque, inadvertent reverse thrust/power, in-flight shutdown (IFSD), inability to autofeather, thermal engine overspeed (which can alternatively or additionally be implemented by mechanical protection means), thermal engine shaft shear (which can alternatively or additionally be implemented by mechanical protection means), and/or uncontrollable high thrust (UHT).

All parameters affecting a control and protection function (e.g. speed, torque, propeller blade angle, etc.) can have completely independent means of measurement (e.g. multiple probes or segregated means of measurement). For parameters from aircraft systems, similar requirements can be used to ensure that no single failure can result in a catastrophic or hazardous safety case.

The ECU can have control over an overspeed valve (OSV), a battery contactor, and a feathering valve. The OSV can provide a fuel shutoff means upstream of the fuel control unit (FCU) and can be used to shutdown the hM when required. The feathering valve can have the authority to coarsen the blade angle to "grab more air" to push the propeller out of certain critical operating areas. The battery contactor can cut off current from the battery system to the electric motor.

The propeller, thermal engine, and at least some powertrain safety functions can be contained in the system protection module (e.g., ECU protection processor (ECU-PP)). Propeller overspeed, auto feather, and reverse beta functions can be propeller protection functions contained the ECU-PP, for example. Thermal engine overspeed and shaft shear protection can be located in the ECU-PP, or designed in the thermal engine mechanical design, for example. The electric motor protection module (e.g., EPC-PP) can perform the electric motor control-level protection functions, e.g., overspeed, overcurrent, and/or overtemperature protection. The ECU-PP can perform powertrain-level protection functions such as uncontrollable high-thrust protection. Ambient air data, each power lane's torque and speed data, and the propeller operating conditions (speed, torque, and propeller angle) can be provided to the ECU-PP where the processor can compute the total output thrust.

The ECU-PP can have the authority to shutdown each power lane and feather the propeller, for example. Protection means can be implemented to protect against hM failure cases resulting in engine and aircraft level safety cases. For example, in the event of an initiating event with the potential to lead to a hazardous or catastrophic event, the ECU-PP can cut off fuel flow using the OSV. Heat motor protection functions may include protection against non-containment of high-energy debris, shaft shear protection, overspeed protection, and/or protection against uncontrollable high thrust. Uncontrollable high thrust protection can involve understanding propeller and engine and motor interactions as they create thrust for the aircraft. The protection means could be implemented to both feather and shutdown the engine, for example. UHT protection may be required at high-power conditions such as takeoff in certain implementations. If the propeller blades were feathered at high power, it could lead to an overtorque condition. As a result, during high-power shutdown, the ECU-PP may sequence the motor shutoff first prior to feathering the propeller, for example.

For the propeller system, independent protection means for the propeller system may be utilized. The protection means for propeller system can depend on the potential hazard being mitigated. In the event of an in-flight shutdown (IFSD), the propeller can be feathered to reduce the drag. Inability to feather after an IFSD on takeoff or climb could be potentially catastrophic. Protection means against a propeller overspeed and potential blade separation can also be provided by driving the propeller blade angle towards feather, coarsening the blade. By coarsening the blade angle, the propeller "grabs" more air and slows down as the rotational energy is transferred to torque. Protection against inadvertent operation in reverse beta region can be implemented in the ECU-PP as well, for example.

Certain embodiments can provide a reduction in pilot workload for the start sequence. The HEP control system can automate starting functions to coordinate between the cockpit interface, the electric motor, and the heat engine. Single lever power control can greatly simplify the number of required inputs from the pilot and the required indications to monitor the engine start-up sequence. Certain embodiments can allow for reduction in pilot workload for most phases of flight. For example, single lever power control with the "mode select" can allow the pilot to control the propeller, electric motor, and thermal engine running speed through these two inputs, as opposed to two levers (e.g., a PLA and a CLA input).

Integrating the control into a single unit, e.g., the ECU, can allow for greater access to data for the use of trend monitoring, maintenance diagnosis, and repair tools. The ECU can be able to monitor the operating data of all elements of the propulsion system to determine potential reductions in performance or negative trends in reliability. Certain embodiments can centralize control and protection functions to provide a system that can be easier to update and upgrade. Changes to the system can be performed in a more central place as opposed to updating each controller unit.

Any controllers and/or modules described above can include any suitable hardware module(s) and/or software module(s). Any suitable controllers and/or modules can be independent of each other or can be hosted together and/or integrated together in any suitable manner (e.g., various software modules hosted on the same computer hardware).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control system for a hybrid electric powerplant of an aircraft, comprising:
a heat engine controller configured to receive one or more power command settings and to determine a heat engine setting and an electric motor setting, the heat engine controller configured to use the heat engine setting to control a heat engine system as a function of the heat engine setting to control torque output by a heat engine, wherein the heat engine controller is configured to output the electric motor setting;
an electric motor controller operatively connected to the heat engine controller, the electric motor controller configured to receive the electric motor setting from the heat engine controller and to control an electric motor system as a function of the electric motor setting to control torque output by an electric motor; and
a system protection module that is part of or connected to the heat engine controller and configured to provide one or more protection commands to directly control one or more heat engine protection systems and one or more electric motor protection systems.

2. The system of claim 1, further comprising an electric motor protection module that is part of or connected to the electric motor controller and configured to provide one or more protection commands to directly control one or more electric motor protection systems.

3. The system of claim 2, wherein the system protection module is configured to provide powertrain level protection for the electric motor system.

4. The system of claim 3, wherein the electric motor protection module is configured to provide lane level protection to the electric motor system.

5. The system of claim 4, wherein the powertrain level protection includes uncontrollable high thrust protection, and/or wherein the lane level protection includes overspeed, overcurrent, and/or over temperature protection.

6. The system of claim 5, wherein the system protection module is configured to provide heat engine overspeed and/or shaft shear protection.

7. The system of claim 2, wherein the heat engine controller is configured to determine a propeller setting and to use the propeller setting to control a propeller control system as a function of the propeller setting.

8. The system of claim 7, wherein the system protection module is configured to provide one or more protection commands to directly control one or more propeller protection systems.

9. The system of claim 8, wherein the heat engine controller and/or the system protection module is operatively connected to each of the electric motor, the heat engine, and/or the propeller system to receive feedback therefrom to provide control thereto and/or protection control thereto, wherein the electric motor protection module is operatively connected to the electric motor to receive electric motor feedback therefrom to provide protection control for the electric motor.

10. The system of claim 9, wherein the electric motor system includes a battery management system (BMS), wherein the electric motor protection system includes an electrical cutoff mechanism disposed between the BMS and the electric motor, the electrical cutoff mechanism being configured to be controlled by the electric motor protection module and the system protection module to cut off electrical energy to the electric motor in a protection state.

11. The system of claim 9, wherein the heat engine system is a fuel control unit, wherein the heat engine protection system includes a fuel shutoff valve configured to be controlled by the system protection module to cut off fuel flow to the fuel control unit in a protection state.

12. The system of claim 9, wherein the propeller control system is a propeller control unit configured to control a pitch of the propeller, wherein the propeller protection system includes a feathering valve configured to be controlled by the system protection module to coarsen the propeller pitch in a protection state.

13. The system of claim 9, wherein the electric motor controller and/or the electric motor protection module is/are operatively connected to the heat engine controller to provide controller operation feedback and/or respective system feedback to the heat engine controller.

14. The system of claim 9, wherein the heat engine controller includes a thrust control module configured to divide a thrust command into an electric torque command for use by the electric motor controller and a heat engine torque command for use by the heat engine controller such that the electric motor setting includes the electric torque command and the heat engine setting includes a heat engine torque command.

15. The system of claim 14, wherein the heat engine controller includes a propeller control module configured to receive a propeller mode setting and to output a propeller setting to achieve a selected propeller mode.

16. The system of claim 4, wherein the heat engine controller is configured to receive feedback from the electric motor protection module for detection and/or reporting of a problem with the electric motor system to diagnose a cause and/or resolve the problem by controlling a different system.

17. The system of claim 9, wherein the heat engine feedback, the electric motor feedback, and/or the propeller system feedback includes a torque value and/or a speed value.

18. The system of claim 17, wherein the heat engine feedback includes a temperature value for detecting heat engine fire.

19. The system of claim 9, wherein ambient air data is input to the heat engine controller and/or to the system protection module, wherein the heat engine controller and/or the system protection module are configured to use the ambient air data for control and/or protection control, respectively.

20. A method, comprising:
  controlling an electric motor with an electric motor controller;
  controlling a heat engine with a heat engine controller;
  providing an electric motor torque command to the electric motor controller from the heat engine controller;
  providing overspeed or overtorque protection to the electric motor with an electric motor protection module that is part of or connected to the electric motor controller;
  providing overspeed or overtorque protection to the heat engine with a system protection module that is part of or connected to the heat engine controller; and
  providing uncontrollable thrust protection for the electric motor using the system protection module.

\* \* \* \* \*